(12) United States Patent
Ouellette et al.

(10) Patent No.: US 8,625,467 B2
(45) Date of Patent: Jan. 7, 2014

(54) RATE-VARYING MULTICAST TRANSMISSION FOR CLOCK DISTRIBUTION IN PACKET NETWORKS

(75) Inventors: Michel Ouellette, Orleans (CA); Peter Ashwood-Smith, Gatineau (CA)

(73) Assignee: Futurewei Technologies, Inc., Plano, TX (US)

( * ) Notice: Subject to any disclaimer, the term of this patent is extended or adjusted under 35 U.S.C. 154(b) by 322 days.

(21) Appl. No.: 13/028,656

(22) Filed: Feb. 16, 2011

(65) Prior Publication Data

US 2011/0199941 A1 Aug. 18, 2011

Related U.S. Application Data

(60) Provisional application No. 61/304,983, filed on Feb. 16, 2010.

(51) Int. Cl.
*H04L 12/28* (2006.01)

(52) U.S. Cl.
USPC ........................................................ 370/256

(58) Field of Classification Search
USPC .................... 370/244, 253, 254, 256, 390
See application file for complete search history.

(56) References Cited

FOREIGN PATENT DOCUMENTS

| EP | 1610502 A1 | 12/2005 |
|----|------------|---------|
| WO | 2001/019029 A1 | 3/2001 |
| WO | 2009/105838 A1 | 9/2009 |

OTHER PUBLICATIONS

Ferrant, J., "Report of the Edinburgh SG 15/13 Interim Meeting," Rapporteur Q13, Edinburgh, Jun. 8-12, 2009, 18 pages.
Foreign Communications From a Counterpart Application, European Application 11710916.5, European Office Action dated Jan. 10, 2013, 7 pages.
"Draft Standard for a Precision Clock Synchronization Protocol for Networked Measurement and Control Systems," IEEE Standard P1588™ D2.2, 2007, 305 pages.
"IEEE Standard for Local and Metropolitan Area Networks—Virtual Bridged Local Area Networks—Amendment 5: Connectivity Fault Management," IEEE Standard Std 802.1aq/D3.0™, Jun. 10, 2010, 246 pages.
"Series G: Transmission Systems and Media, Digital Systems and Networks Packet Over Transport Aspects—Quality and Availability Targets," ITUT G.8265.1/ Y 1365.1, Oct. 2010, 30 pages.
Ferrant, J., et. al., "ITU-T SG 15 Documents Pertaining to Synchronization on Q13/15," Apr. 20, 2010, 2 pages.
Wittmann, R., et. al., "AMnet: Active Multicasting Network," IEEE International Conference in Atlanta, Georgia, vol. 2, Jun. 7, 1998, pp. 896-900. Foreign Communication From a Related Counterpart Application, PCT Application, PCT/US2011/025037, International Search Report, Jul. 6, 2011, 6 pages.
Foreign Communication From a Related Counterpart Application, PCT Application, PCT/US2011/025037, Written Opinion, Jul. 6, 2011, 10 pages.

*Primary Examiner* — Man Phan
*Assistant Examiner* — Nourali Mansoury
(74) *Attorney, Agent, or Firm* — Conley Rose, P.C.; Grant Rodolph; Rayhao Chung

(57) ABSTRACT

In at least some embodiments, the disclosure includes an apparatus a root node in a packet based network that multicasts a plurality of packets. The apparatus also includes an intermediary node coupled to the root node and a plurality of leaf nodes coupled to the intermediary node. The root node, the intermediary node, and the plurality of leaf nodes are arranged in a tree topology. The packets are received at the intermediary node from the root node at a data rate equal to the data rate of the leaf node having the maximum data rate. The packets are multicast from the intermediary node to each of the plurality of leaf nodes at a plurality of different data rates such that each particular one of the plurality of leaf nodes receives the packets at a data rate corresponding to the data rate for the particular one of the plurality of leaf nodes.

16 Claims, 11 Drawing Sheets

RATE-VARYING MULTICAST TRANSMISSION FOR CLOCK DISTRIBUTION IN PACKET NETWORKS

CROSS-REFERENCE TO RELATED APPLICATIONS

The present application claims the benefit of U.S. Provisional Patent Application No. 61/304,983 filed Feb. 16, 2010 by Michel Ouellette et al. and entitled "Rate-Varying Multicast Transmission for Clock Distribution in Packet Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communications and data networks are comprised of nodes that transport data through the network. The nodes may include routers, switches, bridges, or combinations thereof that transport the individual data packets or frames through the network. Some networks may offer data services that forward data frames or packets from one node to another node across the network without using pre-configured routes on intermediate nodes. Other networks may forward the data frames or packets from one node to another node across the network along pre-configured or pre-established paths. The packets forwarded in the network may be unicast packets that are transmitted to a plurality of nodes via a plurality of corresponding point-to-point (P2P) links. Alternatively, the packets forwarded in the network may be multicast packets that are transmitted to a plurality of nodes via a point-to-multipoint (P2MP) link or a tree.

SUMMARY

In one embodiment, the disclosure includes an apparatus a root node in a packet based network that multicasts a plurality of packets. The apparatus also includes one or more intermediary nodes coupled to the root node and a plurality of leaf nodes coupled each of which is coupled to one of the intermediary nodes. The root node, the intermediary node, and the plurality of leaf nodes are arranged in a tree topology. The packets are received at the intermediary node from the root node at a data rate equal to the data rate of the leaf node having the maximum data rate. The packets are multicast from the intermediary node to each of the plurality of leaf nodes at a plurality of different data rates such that each particular one of the plurality of leaf nodes receives the packets at a data rate corresponding to the data rate for the particular one of the plurality of leaf nodes.

In another embodiment, the disclosure includes a network component comprising a packet replication block coupled to an ingress link and configured to replicate a plurality of packets received on the ingress link at an upstream data rate. The network component also includes a plurality of packet discard blocks coupled to the packet replication block and to a plurality of egress links and configured to pass through or reduce some of the received packets to match a plurality of downstream data rates associated with the egress links.

In a third aspect, the disclosure includes a method. The method comprises receiving a plurality of advertised downstream data rates via a plurality of egress links from a plurality of downstream nodes. The method also comprises assigning an upstream data rate that corresponds to a maximum of the received downstream data rates to an ingress link. The method further comprises advertising the upstream data rate via the ingress link to an upstream node.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for providing rate-varying multicast transmissions for clock distribution in packet based networks. The rate-varying multicast transmissions may be provided from a multicast source to a plurality of multicast receivers. The receivers may receive similar multicast transmissions in the form of multicast packets from the source at different rates. The multicast packets may be used to synchronize the frequency and/or time of the clocks at the receivers, e.g., with the source's clock. The multicast packets may be delivered to the receivers at different rates that may match the different clock rates of the receivers, e.g., according to the different link bandwidths and/or processing capabilities of the receivers.

Figure 1:
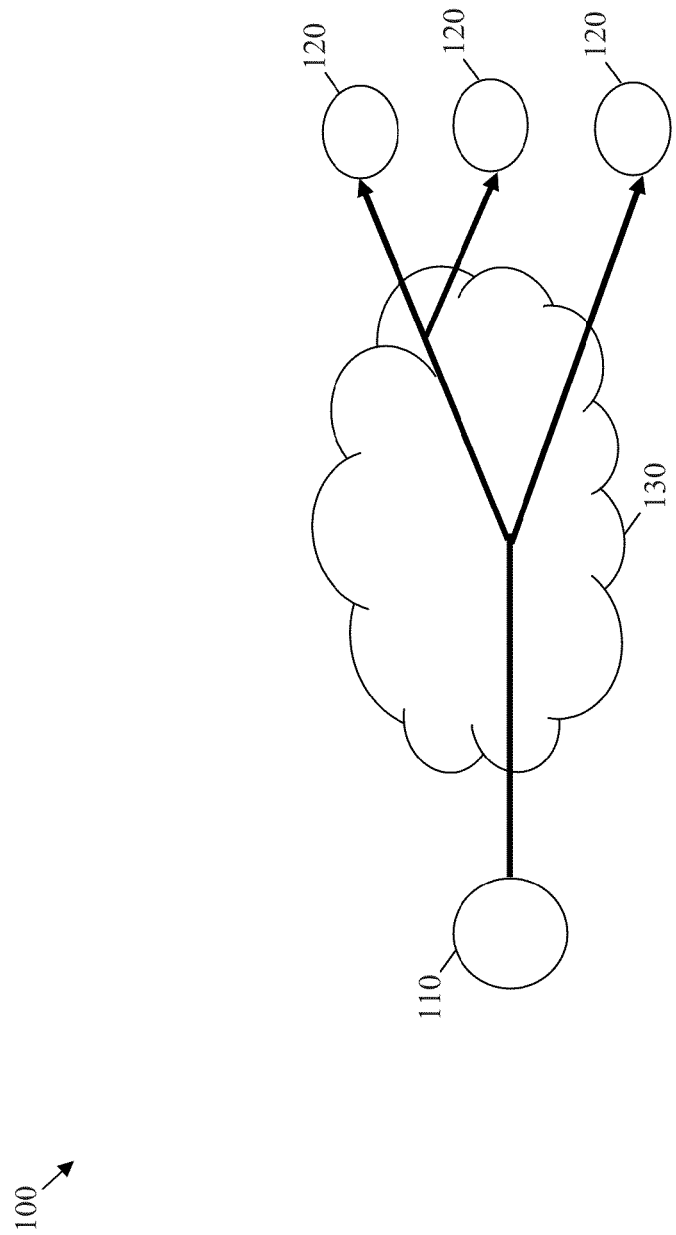
FIG. 1 is a schematic diagram of an embodiment of a packet multicast scheme.

FIG. 1 illustrates a typical packet multicast scheme 100 that may be used to transmit packets in packet based networks. The packet multicast scheme 100 may be implemented between a source or root node 110 and a plurality of leaf nodes 120 that may be all coupled to a packet based network 130. For instance, the packet based network 130 may be an Ethernet network, an Internet Protocol (IP) network, a Multi-Protocol Label Switching (MPLS) network, or any other packet switched network (PSN).

The root node 110 and similarly the leaf nodes 120 may be any nodes, devices, or components configured to receive, transmit, and/or forward packets associated with the packet based network 130. Specifically, in the packet multicast scheme 100, the root node 110 may be a transmitter of a plurality of packets and the leaf nodes 120 may be the receivers of the packets. The same or similar packets may be duplicated and sent to every leaf node 120 via a plurality of links in a tree topology, e.g., a P2MP link. For instance, the packets may be distributed to the leaf nodes 120 via a multicast tree distribution tree topology, such as an Ethernet tree (E-Tree) service. In an embodiment, the tree topology may be generated as described in the Institute of Electrical and Electronics Engineers (IEEE) standard 802.1aq which is incorporated herein by reference.

The tree or P2MP link may comprise a plurality of links or paths, e.g., in the packet based network 130, that may couple each leaf node 120 to the root node 110. The links or paths may be coupled to a plurality of internal nodes (not shown) in the packet based network 130. The internal nodes may receive and replicate the packets, when necessary, before forwarding the packets towards the leaf nodes 120. Typically, the packets may be transmitted from the root node 110 over the P2MP link and received by the leaf nodes 120 at about the same data rate. This is indicated by the same solid line arrow type for each of the leaf nodes 120. The packets arriving and replicated at the internal nodes may also have about the same data rates as the root node 110 and the leaf nodes 120. The packet multicast scheme 100 may efficiently use network bandwidth by having the internal nodes replicate the packets that are sent from the root node to the leaf, e.g., in comparison to packet unicast schemes where the root node must itself replicate the packet (for each leaf) before it can be sent to the internal nodes to reach the leaf nodes. Multicast decreases the processing and traffic of the root node while minimizing the number of packets to be forwarded by the intermediate nodes.

Figure 2:
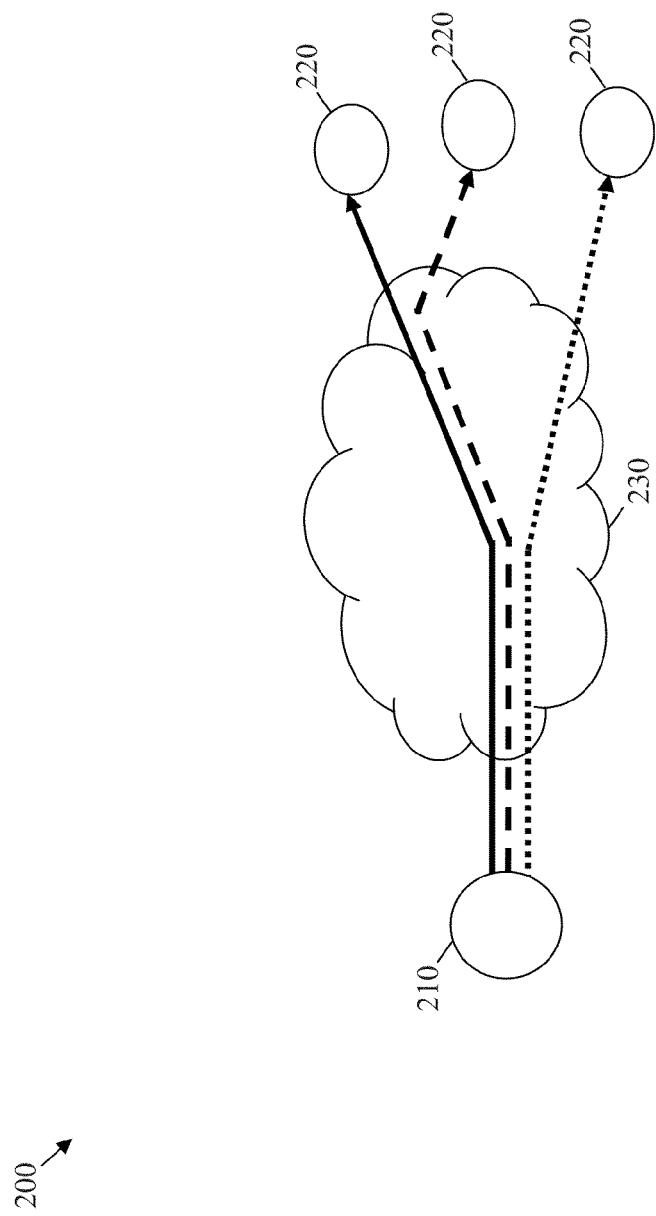
FIG. 2 is a schematic diagram of an embodiment of a packet unicast scheme.

FIG. 2 illustrates a typical packet unicast scheme 200 that may be used to transmit packets in packet based networks. The packet unicast scheme 200 may be implemented between a source or root node 210 and a plurality of leaf nodes 220 that may be all coupled to a packet based network. The packet based network 230, the root node 210, and the leaf nodes 220 may be similar to the packet based network 130, the root node 110, and the leaf nodes 120, respectively.

However, the root node 210 may transmit a plurality of similar or different packets to the leaf nodes 220. The packets may be forwarded by the intermediate nodes (not shown) to the leaf nodes 220 via a plurality of corresponding links, e.g., a P2P links. Each link associated between the root node and a leaf node 220 may be established separately or independent of the other links for the other leaf nodes 220. Each P2P link may transport similar or different packets from the other links at similar or different rates. This is indicated by the different solid and dotted line arrow types for the leaf nodes 220. The links may be coupled to a plurality of internal nodes (not shown) in the packet based network 230. The internal nodes may receive and forward the packets, e.g., without duplication, towards the leaf nodes 220.

The packet unicast scheme 200 may use higher data rates and may have reduced network bandwidth utilization than the packet multicast scheme 100. For instance, the total transported data rates in the packet multicast scheme 100 may be about equal to the received data rates at each of the leaf nodes 120, while the total transported data rates in the packet unicast scheme 200 may be about equal to the sum of the received data rates at all the leaf nodes 220. Thus, the packet multicast scheme 100 may be less demanding than the packet unicast scheme 200 in terms of data processing, bandwidth consumption, and/or the amount of transported traffic.

Figure 3:
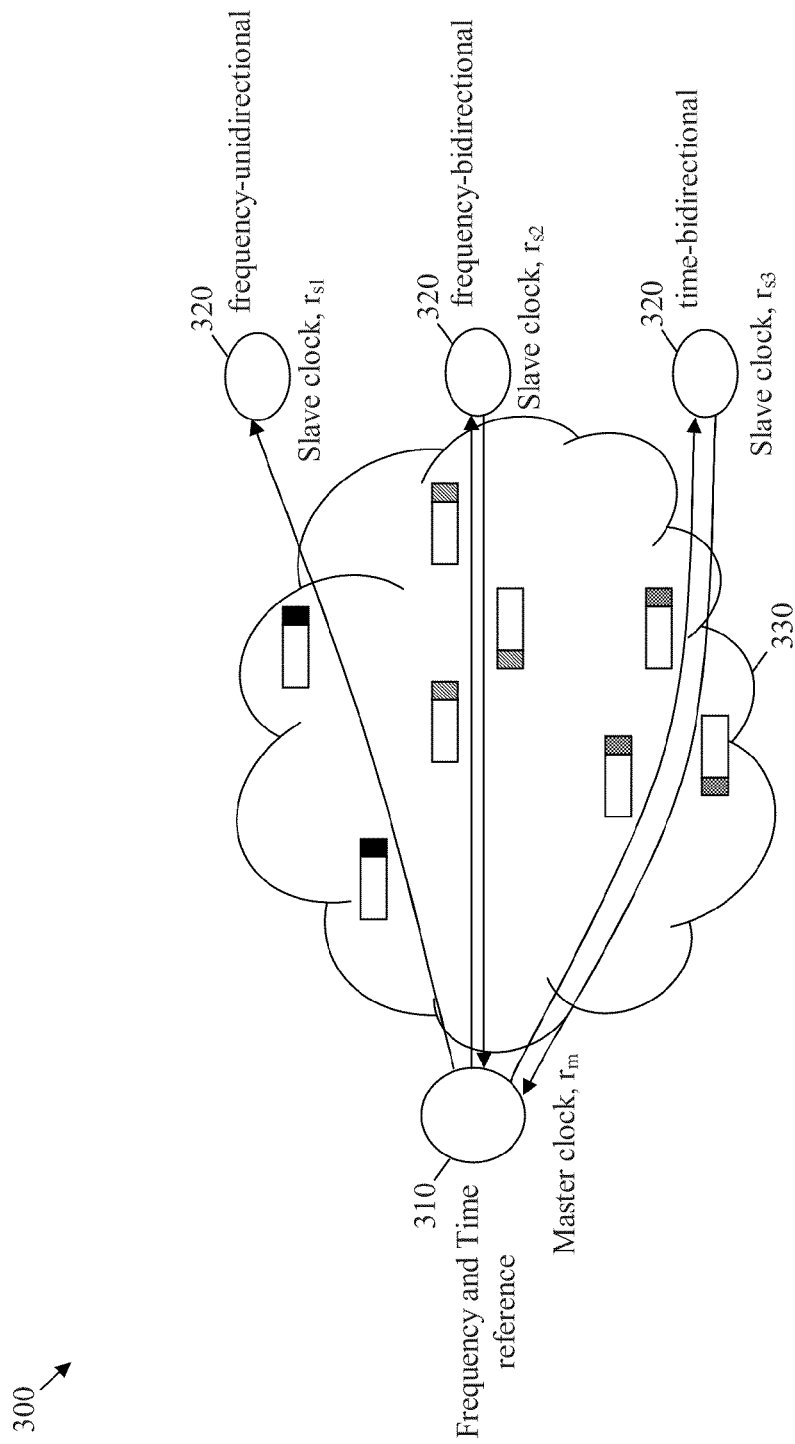
FIG. 3 is a schematic diagram of an embodiment of a clock distribution scheme.

FIG. 3 illustrates a clock distribution scheme 300 that may be used to synchronize or align the clock/timing between a master clock and a plurality of slave clocks. The clock distribution scheme 300 may be implemented between a source or root node 310 and a plurality of leaf nodes 320 that may be all coupled to a packet based network. The packet based network 330, the root node 310, and the leaf nodes 320 may be configured substantially similar to the packet based network 130, the root node 110, and the leaf nodes 120, respectively.

Specifically, the root node 310 may comprise or may be coupled to the master clock (not shown) and the leaf nodes 320 may comprise or may be coupled to a plurality of corresponding slave clocks (not shown). The master and slave may be used to control the transmissions and/or processing times of the source node 310 and the leaf nodes 320. The clock distribution scheme 300 may be used to synchronize the frequency and/or time of the slave clocks with the master clock, e.g., to synchronize the communications between the root node 310 and the leaf nodes 320. The frequency/time at the individual slave clocks may be aligned with the frequency/time of the master clock using a plurality of timestamps or synchronization information that may be sent in a plurality of transmitted packets between the root node 310 and the leaf nodes 320. The same timestamps or synchronization information may be transmitted from the root node 310 to each of the leaf nodes 320.

The synchronization information may be sent from the root node 310 to the leaf nodes 320 in a unidirectional manner, e.g., downstream only. Alternatively, the root node 310 and the leaf nodes 320 may exchange synchronization information in a bidirectional manner, e.g., both downstream and upstream. Examples of unidirectional and bidirectional frequency/time distribution schemes are described in IEEE 1588, which is incorporated herein by reference. Further, each leaf node 320 may be configured to receive the synchronization information at a corresponding slave clock rate. The rates at the leaf nodes 320 may vary depending on different network conditions, such as microwave links versus fiber links, different adaptive clock recovery implementations, different packet delay variation tolerance, and/or different oscillatory quality.

For instance, the root node 310 may be configured to transmit frequency and/or time information in a plurality of packets at a master clock rate, $r_m$, in a unidirectional scheme, bidirectional scheme, or both. The packets may comprise the same time and frequency information. A first leaf node 320 from the leaf nodes 320 may be configured to receive frequency information in the packets at a first slave rate, $r_{s1}$, in a unidirectional scheme. A second leaf node 320 may also be configured to receive frequency information in the packets at a second slave rate, $r_{s2}$, and exchange frequency information with the root node 310 in a bidirectional scheme. A third leaf node 320 may also be configured to receive time information in the packets at a third slave rate, $r_{s3}$, and exchange time information with the root node 310 in a bidirectional scheme. The packets transmitted at different rates to the leaf nodes 320 are shown using different patterns in FIG. 3. The unidirectional scheme is shown using a single solid line arrow and the bidirectional schemes are shown using two opposite solid line arrows.

Figure 4:
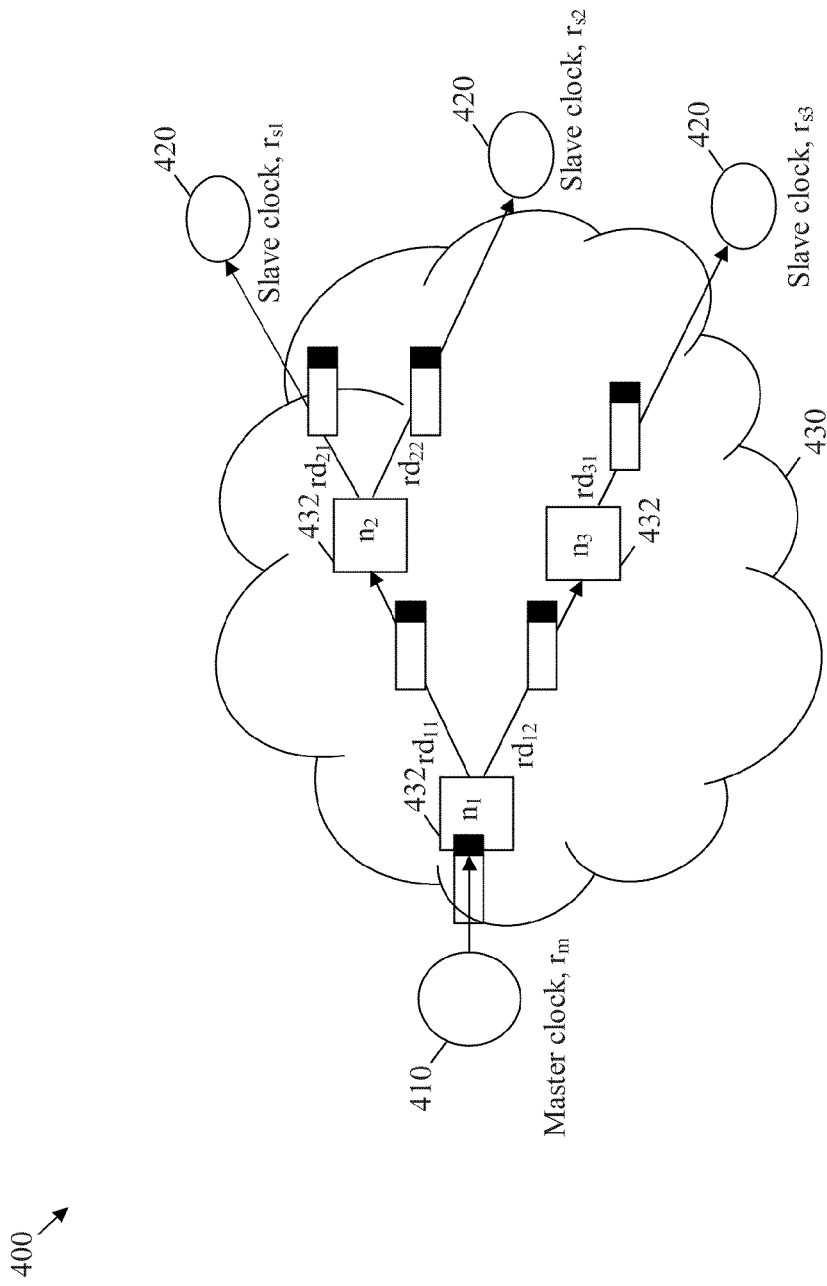
FIG. 4 is a schematic diagram of an embodiment of a multicast clock distribution scheme.

FIG. 4 illustrates an embodiment of a multicast clock distribution scheme 400 that may implement a clock (e.g., time/frequency) distribution scheme using a packet multicast scheme. For instance, the multicast clock distribution scheme 400 may implement the clock distribution scheme 300 using the packet multicast scheme 100. The multicast clock distribution scheme 400 may be implemented between a source or root node 410 and a plurality of leaf nodes 420 that may be all coupled to a packet based network 430. The packet based network 430 may also comprise a plurality of internal nodes 432. The packet based network 430, the root node 410, and the leaf nodes 420 may be configured substantially similar to the packet based network 130, the root node 110, and the leaf nodes 120, respectively. The internal nodes 432 may be any nodes, devices, or components configured to receive, transmit, and/or forward packets in the packet based network 430.

The root node 410 may transmit frequency and/or time information in a plurality of packets at a master clock rate, $r_m$, to the leaf nodes 420, e.g., in a unidirectional and/or bidirectional scheme. The packets may be received, duplicated, and forwarded to the leaf nodes 420 by the internal nodes 432 at about the same data rates. For instance, a first internal node 432 (n1) may receive the packets from the root node 410, duplicate the packets, forward a first copy of the packets to a second internal node 432 (n2) via first link at a first data rate ($rd_{11}$), and forward a second copy of the packets to a third internal node 432 (n3) via a second link at a second data rate ($rd_{12}$). The second internal node 432 may receive the packets from the first internal node 432, duplicate the packets, forward a first copy of the packets to a first leaf node 420 via third link at a third data rate ($rd_{21}$), and forward a second copy of the packets to a second leaf node 420 via a fourth link at a fourth data rate ($rd_{22}$). Similarly, the third internal node 432 may receive packets from the first internal node 432 and forward the packets to a third leaf node 420 via a fifth link at a fifth data rate ($rd_{31}$).

Using this packet multicast scheme, the data rates of the internal nodes 432 and the corresponding links may be substantially equal, which may improve bandwidth consumption in the packet based network 430. As such, $rd_{11}$, $rd_{12}$, $rd_{21}$, $rd_{22}$, and $rd_{23}$ may all be about equal to $r_m$. For example, each of the data rates may be equal to about 20 messages per second. The same packets transmitted at about the same rates are shown using the same pattern in FIG. 4. However, the received data rates at the leaf nodes 420 may not efficiently meet the different data rate requirements of the leaf nodes 420. For instance, the first leaf node 420, the second leaf node 420, and the third leaf node 420 may have a first slave rate, $r_{s1}$, a second slave rate, $r_{s2}$, and a third slave rate, $r_{s3}$, respectively, which may be different based on different network conditions. The three leaf nodes 420 may receive about the same data rates from the packet based network 430, which may be greater than or smaller than the individual corresponding slave rates.

Figure 5:
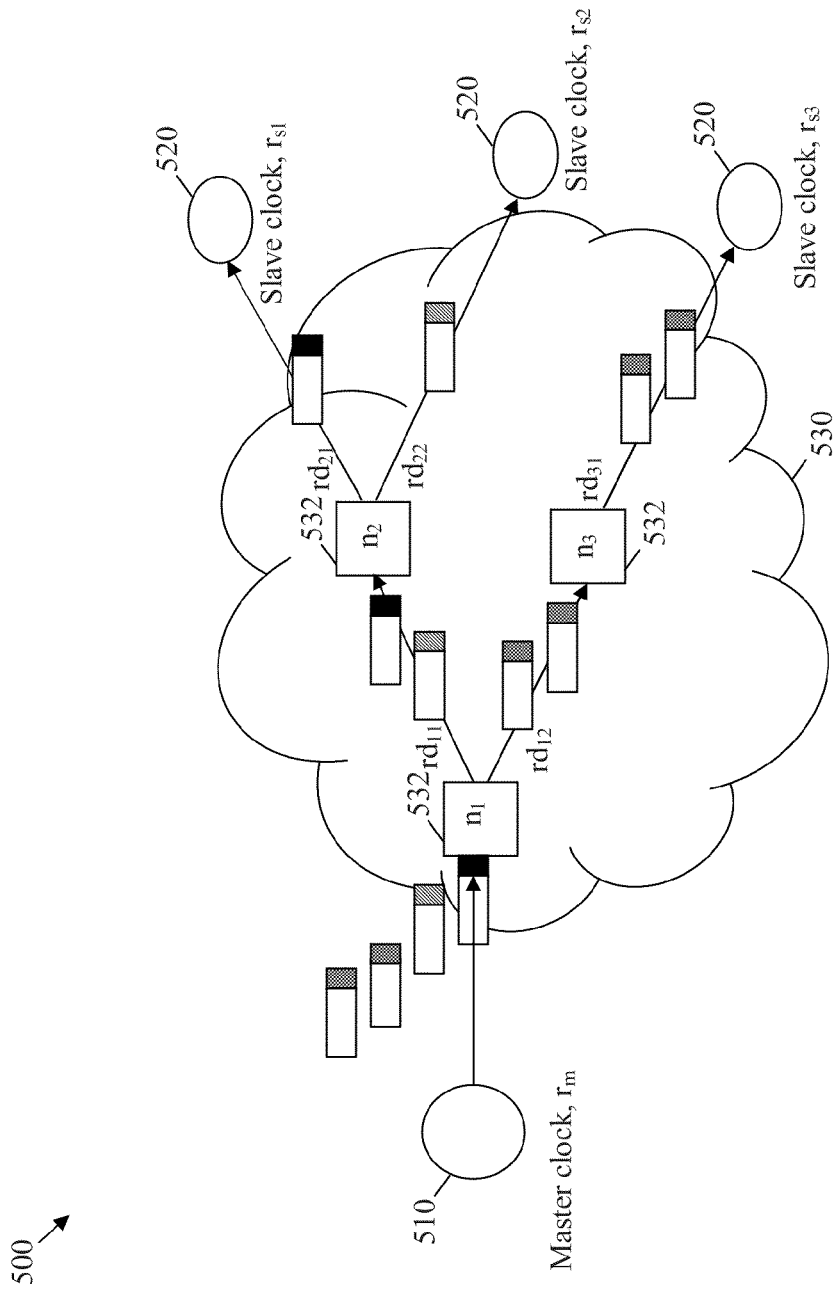
FIG. 5 is a schematic diagram of an embodiment of a unicast clock distribution scheme.

FIG. 5 illustrates an embodiment of a unicast clock distribution scheme 500 that may implement a clock (e.g., time/frequency) distribution scheme using a packet unicast scheme. For instance, the multicast clock distribution scheme 500 may implement the clock distribution scheme 300 using the packet unicast scheme 200. The unicast clock distribution scheme 500 may be implemented between a source or root node 510 and a plurality of leaf nodes 520 that may be all coupled to a packet based network 530. The packet based network 530 may also comprise a plurality of internal nodes 532. The packet based network 530, the root node 510, and the leaf nodes 520 may be configured substantially similar to the packet based network 230, the root node 210, and the leaf nodes 220, respectively. The internal nodes 532 may be any nodes, devices, or components configured to receive, transmit, and/or forward packets in the packet based network 530.

The root node 510 may transmit frequency and/or time information in a plurality of packets at a master clock rate, $r_m$, to the leaf nodes 520, e.g., in a unidirectional and/or bidirectional scheme. Unlike the multicast clock distribution scheme 400, the root node 510 may meet the different data rate requirements of the slave clocks at the leaf nodes 420 by transmitting different sets of packets at the different data rates of the leaf node 520 (indicated by different patterns in FIG. 5). Specifically, the total transmitted data rate from the source node 510 may be about equal to the sum of all the slave rates, e.g., $r_m = \Sigma r_{si}$, where i is the quantity of leaf nodes 520. The packets may be received and forwarded properly to the designated leaf nodes 520 by the internal nodes 532. The internal nodes 532 may forward the packets on a plurality of links at corresponding data rates $rd_{ij}$, where i indicates the internal node 532 and j indicates one of its links. The link data rates $rd_{ij}$ may be equal to about the sums of all the slave rates forwarded on the link.

For instance, in the case of three leaf nodes 520, the total transmitted data rates from the source node 510 may be $r_m = r_{s1} + r_{s2} + r_{s3}$, where $r_{s1}$, $r_{s2}$, and $r_{s3}$, are the slave rates of the three leaf nodes 520. For example, if $r_{s1}$ and similarly $r_{s2}$ are equal to about 10 messages per second and $r_{s3}$ is equal to about 20 messages per second, then $r_m$ may be equal to about 40 messages per second. Specifically, a first internal node 532 (n1) may receive all the packets at the total data rate $r_m$ from the root node 410. The first internal node 532 may then forward the packets designated for a first leaf node 520 and a second leaf node 520 on a first link to a second internal node 532 (n2) at a first data rate ($rd_{11}$), and forward the packets designated for a third leaf node 520 on a second link to a third internal node 532 (n3) at a second data rate ($rd_{12}$). The first data rate may be equal to about the sum of the first slave rate for the first leaf node 520 and the second slave rate for the second leaf node 520, e.g., $rd_{11} = r_{s1} + r_{s2}$. For example, if $r_{s1}$ and similarly $r_{s2}$ are equal to about 10 messages per second and $r_{s3}$ is equal to about 20 messages per second, then $rd_{11}$ may be equal to about 20 messages per second and $rd_{12}$ may be equal to about 20 messages per second. The second data rate may be about equal to the third slave rate of the third leaf node 520, e.g., $rd_{12} = r_{s3}$.

The second internal node 532 may forward the packets designated for the first leaf node 520 on a third link at a third data rate ($rd_{21}$), and forward the packets designated for the second leaf node 520 on a fourth link at a fourth data rate ($rd_{22}$). The third data rate may be about equal to the first slave rate of the first leaf node 520, e.g., $rd_{21} = r_{s1}$, and the fourth data rate may be about equal to the second slave rate of the second leaf node 520, e.g., $rd_{22} = r_{s2}$. Similarly, the third internal node 532 may forward the packets designated for the third leaf node 520 on a fifth link at a fifth data rate ($rd_{31}$). The fifth data rate may be about equal to the third slave rate of the third leaf node 520, e.g., $rd_{31} = r_{s3}$.

Using this packet unicast scheme, the data rates of the individual leaf nodes 520 may be met, where each leaf node 520 may receive its designated packets at about its corresponding slave rate. However, this may require transmitting the packets in the packet based network 530 at all the data rates of the leaf nodes 520. This may increase traffic and require more traffic engineering and/or network capacity planning, e.g., in comparison to the packet multicast scheme above, and may also require additional configurations at the master and slave nodes. The total amount of high-priority network bandwidth that may be generated using this scheme may be substantially large, such as in the case of femtocell mobile backhaul, where a large number of slave clocks (e.g., about multiple tens of thousands) may be coupled to a single master clock. Additionally, this packet unicast scheme may not be suitable or compatible with some network protocols that may be designed for packet multicast schemes, such as IEEE 1588 protocol, which is incorporated herein by reference.

Figure 6:
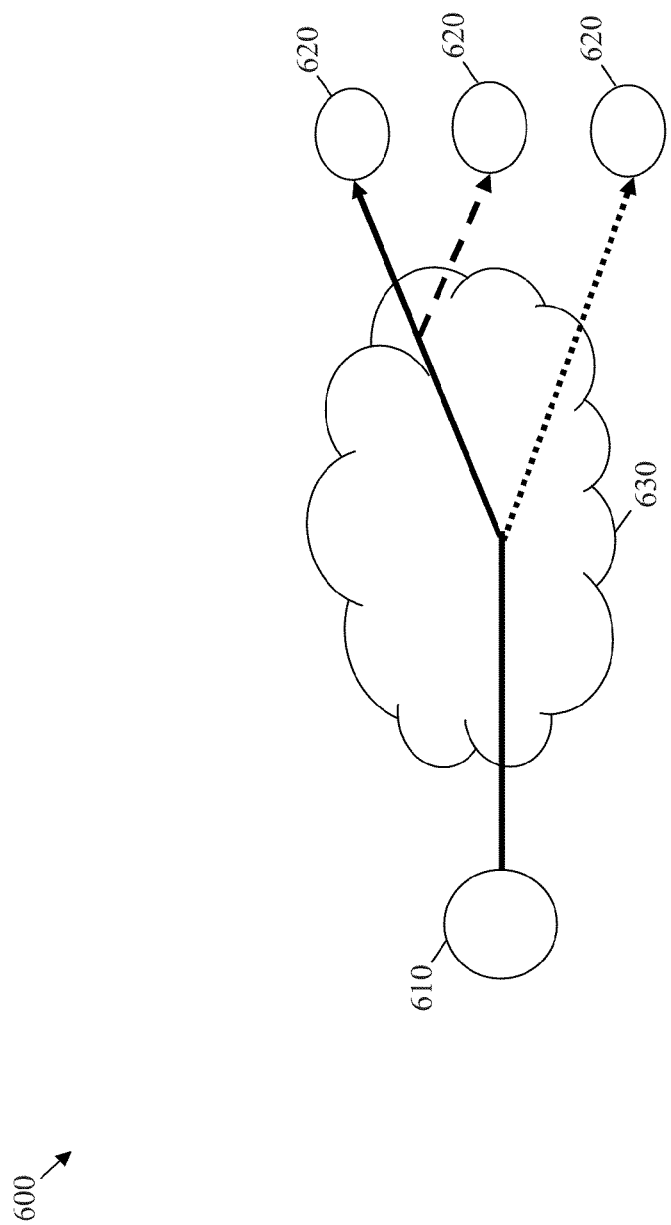
FIG. 6 is a schematic diagram of an embodiment of a rate-varying multicast scheme.

FIG. 6 illustrates an embodiment of a rate-varying multicast scheme 600 that may be used to transmit packets in packet based networks. The rate-varying multicast scheme 600 may be implemented between a source or root node 610 and a plurality of leaf nodes 620 that may be all coupled to a packet based network 630. The packet based network 630, the root node 610, and the leaf nodes 620 may be configured substantially similar to the packet based network 130, the root node 110, and the leaf nodes 120, respectively. The rate-varying multicast scheme 600 may efficiently use network bandwidth utilization, e.g., by using reduced data rates in comparison to packet unicast schemes, and may also meet different data rate requirements of the leaf nodes 420 unlike typical packet multicast schemes.

The root node 610 may transmit a plurality of packets at an initial data rate that may be about equal to the highest data rate of the leaf nodes 620. A plurality of internal nodes (not shown) in the packet based network 630 may receive, replicate, and forward the same or similar packets downstream at the same or reduced rate to meet the different data rates at the leaf nodes 620. The data rates of the leaf nodes 620 may be advertized to the upstream internal nodes, which may in turn advertize all the data rates to the root node 610, as described in detail below. Each internal node may receive a data rate that may be equal to a maximum data rate advertized by the next hops or internal nodes on all the egress links. Each internal node may then forward the same data rate or a reduce data rate on each egress link as advertized by the next hop, until finally each leaf node 620 receives the packets at the leaf node's advertized data rate. Thus, each sub-link in the tree (or P2MP link) may transport the same or similar packets as the other sub-links at similar or different rates. This is indicated by the different solid, dashed, and dotted line arrow types for the leaf nodes 620.

The rate-varying multicast scheme 600 may be suitable for network applications where members of the multicast network may require the same information but at different rates, which may be difficult to achieve using a typical packet multicast scheme, such as the packet multicast scheme 100. Instead, the rate-varying multicast scheme 600 may support multicast traffic for varying-rate receivers. For example, using the rate-varying multicast scheme 600, a video source or root node may transmit relatively high rate video content to a set of high rate or capacity receivers and lower rate video content to another set of low rate or capacity receivers. Another example where the rate-varying multicast scheme 600 may be used is in mobile backhaul, where wireless base stations that comprise slave clocks may be coupled to a packet based network and may receive timing reference signals from a master clock in the network.

Typically, the rate of the synchronization information ($r_{si}$) that a slave or leaf node may require to meet performance metrics (e.g., network wander limits, fractional frequency offsets, etc.) may be related to the packet network characteristics and the corresponding slave clock design. The rate may be a function of various packet network impairments (e.g., latency, delay variation, medium type, etc.), the packet selection and filtering algorithm, and/or the oscillator used in the slave node. For instance, the rate of synchronization information required at a slave node may be higher in the case of microwave environments compared to optical fiber environments. The rate of synchronization information may also be dependent on the slave node's operational state. For instance, the rate required may be higher during warm-up phase compared to steady-state phase. This may also be the case for periods after network rearrangements. Warm-up periods may last for several minutes/hours, while rearrangements may last for several seconds. In such scenarios, the rate-varying multicast scheme 600 may be used to support multicast addressing and provide independent rates of information from master-to-slave. Such system may emulate some of the characteristics of unicast systems but also offer advantages of multicast systems.

Figure 7:
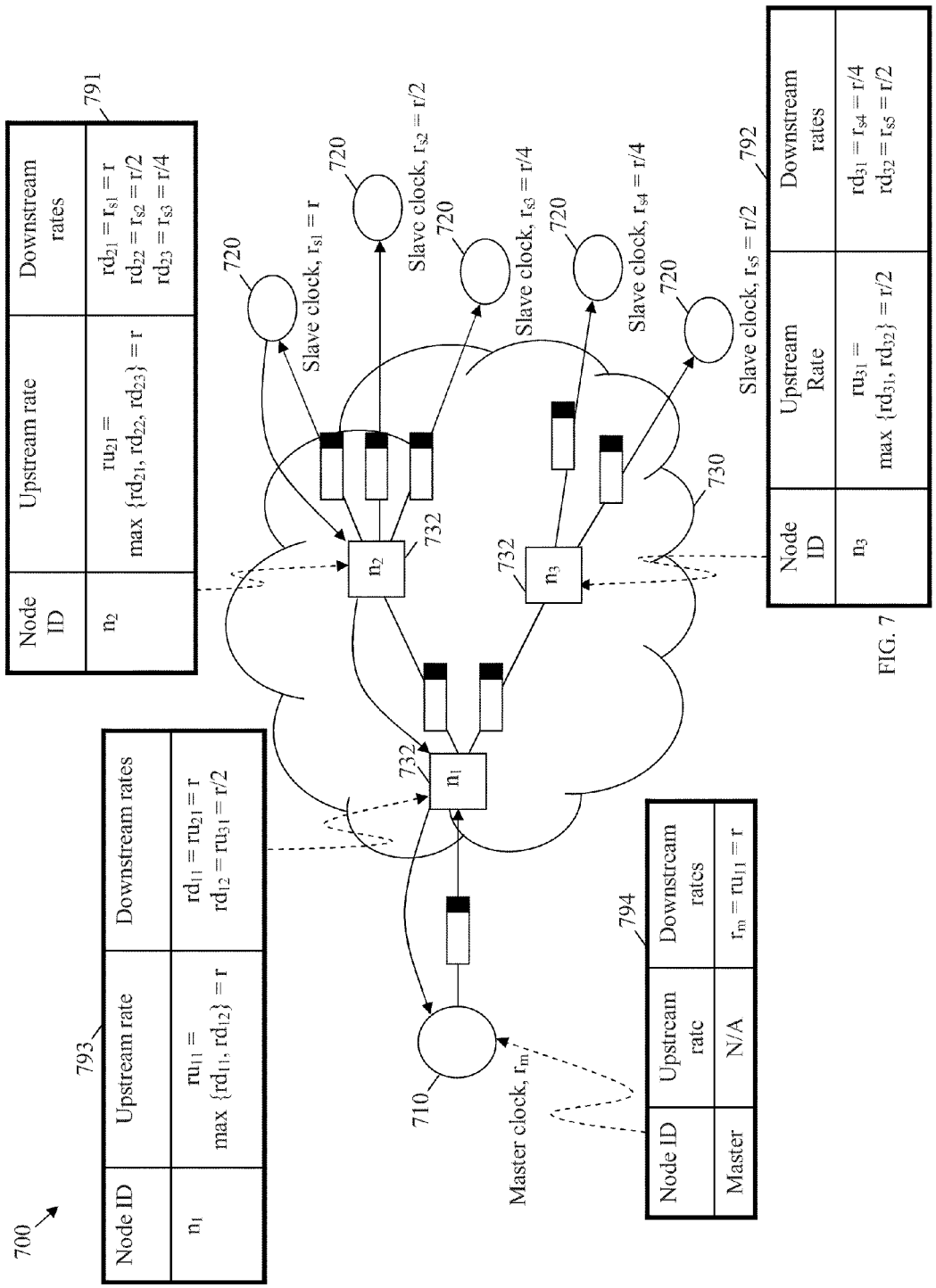
FIG. 7 is a schematic diagram of another embodiment of a rate-varying multicast clock distribution scheme.

FIG. 7 illustrates an embodiment of a rate-varying multicast clock distribution scheme 700 that may be implemented using the rate-varying multicast scheme 600. The rate-varying multicast clock distribution scheme 700 may be implemented between a source or root node 710 and a plurality of leaf nodes 720 that may be all coupled to a packet based network 730. The packet based network 730 may also comprise a plurality of internal nodes 732. The packet based network 730, the root node 710, and the leaf nodes 720 may be configured substantially similar to the packet based network 130, the root node 110, and the leaf nodes 120, respectively. The internal nodes 732 may be any nodes, devices, or components configured to receive, transmit, and/or forward packets in the packet based network 730.

Upon establishing the tree topology (or P2MP link) between the root node 710 and the leaf nodes 720, e.g., using a multicast protocol such as IEEE 802.1ag, the leaf nodes 720 may advertize their slave rates, $r_{si}$, to the packet based network 730 and the root node 710. Each leaf node 720 may advertize its slave rate to a next upstream internal node 732 ($n_i$) that may be directly coupled to the leaf node 720 via a downstream link. The internal node 732 may collect all received data rates on the downstream links, $rd_{ij}$, and maintain the data rates in a table. The rates may be expressed in powers of two, e.g., to reduce the size of advertized traffic. For example, the advertized rates may vary from about 1/64 messages per second to about 256 messages per second. The internal node 732 may then determine the maximum received data rate, $ru_{ij}$, and advertize the maximum data rate to a next upstream internal node 732. This process may be repeated until the root node 710 collects all received advertised data rates from the downstream links, maintain the data rates in a table, and determine the maximum data rate, $r_m$, for all the data rates of the leaf nodes 720.

For instance, a first leaf node 720 may advertise a first slave rate $r_{s1}=r$ to a first upstream internal node 732 (n2) that may be directly coupled to the first leaf node 720. Similarly, both a second leaf node 720 and a third leaf node 720 that may be directly coupled to the same first upstream internal node 732 (n2) may advertise a second slave rate $r_{s2}=r/2$ and a third slave rate $r_{s3}=r/4$, respectively, to the first upstream internal node 732 (n2). The slave rates $r_{s1}$, $r_{s2}$, and $r_{s3}$ may be sent via a first downstream link, a second downstream link, and a third downstream link, respectively, of the first upstream internal node 732 (n2). The first upstream internal node 732 (n2) may collect the received slave rates and assign each slave rate to the corresponding downstream link in a corresponding table 791, e.g., in a downstream rates column. For example, a first downstream data rate $rd_{21}$ may be set to $r_{s1}$ or r, a second downstream data rate $rd_{22}$ may be set to $r_{s2}$ or r/2, and a third downstream data rate $rd_{23}$ may be set to $r_{s3}$ or r/4. The first upstream internal node 732 (n2) may then determine the maximum downstream data rate and assign the maximum downstream data rate to a corresponding upstream link in the corresponding table 791, e.g., in an upstream rate column. For example, the upstream data rate $ru_{21}$ may be set to max$\{rd_{21}, rd_{22}, rd_{23}\}$=r. The table 791 may be stored at the first upstream internal node 732 (n2) or at the packet based network 730 and may also comprise a node identifier (ID) of the first upstream internal node 732, e.g., n2.

Additionally, both a fourth leaf node 720 and a fifth leaf node 720 that may be directly coupled to a same second upstream internal node 732 (n3) may advertise a fourth slave rate $r_{s4}$=r/4 and a fifth slave rate $r_{s5}$=r/2, respectively, to the second upstream internal node 732 (n3). The slave rates $r_{s4}$ and $r_{s4}$ may be sent via a first downstream link and a second downstream link, respectively, of the second upstream internal node 732 (n3). The second upstream internal node 732 (n3) may collect the received slave rates and assign each slave rate to the corresponding downstream link in a corresponding table 792, e.g., in a downstream rates column. For example, a first downstream data rate $rd_{31}$ may be set to $r_{s4}$ or r/4, and a second downstream data rate $rd_{32}$ may be set to $r_{s5}$ or r/2. The second upstream internal node 732 (n3) may then determine the maximum downstream data rate and assign the maximum downstream data rate to a corresponding upstream link in the corresponding table 792, e.g., in an upstream rate column. For example, the upstream data rate $ru_{31}$ may be set to max$\{rd_{31}, rd_{32}\}$=r/2. The table 792 may be stored at the second upstream internal node 732 (n3) or at the packet based network 730 and may also comprise a node ID of the second upstream internal node 732, e.g., n3.

The first upstream internal node 732 may advertise its upstream data rate $ru_{21}$=r to a third upstream internal node 732 (n1) that may be directly coupled to the first upstream internal node 732 (n2). Similarly, the second upstream internal node 732 (n3), that may also be directly coupled to the third upstream internal node 732 (n1), may advertise its upstream data rate $ru_{31}$=r/2 to the third upstream internal node 732 (n1). The upstream data rates $ru_{21}$ and $ru_{31}$ may be sent via a first downstream link and a second downstream link of the third upstream internal node 732 (n1). The third upstream internal node 732 (n1) may collect the received data rates and assign each data rate to the corresponding downstream link in a corresponding table 793, e.g., in a downstream rates column. For example, a first downstream data rate $rd_{11}$ may be set to $ru_{21}$ or r, and a second downstream data rate $rd_{12}$ may be set to $ru_{31}$ or r/2. The third upstream internal node 732 (n1) may then determine the maximum downstream data rate and assign the maximum downstream data rate to a corresponding upstream link in the corresponding table 793, e.g., in an upstream rate column. For example, the upstream data rate $ru_{11}$ may be set to max$\{rd_{11}, rd_{12}\}$=r. The table 793 may be stored at the third upstream internal node 732 (n1) or at the packet based network 730 and may also comprise a node ID of the third upstream internal node 732, e.g., n1.

The third upstream internal node 732 (n1) may then advertise its upstream data rate $ru_{11}$=r to the root node 710 that may be directly coupled to the third upstream internal node 732 (n1). The upstream data rate $ru_{11}$ may be sent via a downstream link of the root node 710, which may set its master rate, to the received data rate in a corresponding table 794, e.g., in a downstream rates column. For example, the master rate $r_m$ may be set to $ru_{11}$ or r. The master rate may also correspond to the maximum data rate of the slave rates of the leaf nodes 720. The table 794 may be stored at the root node 710 or at the packet based network 730 and may also comprise a node ID of the root node 710 that indicates a master or source node.

After determining the master rate or maximum data rate of the slave rates, the root node 710 may transmit at the master rate a plurality of packets, which may comprise frequency/time synchronization information, to the leaf nodes 720 via the internal nodes 732. Each internal node 732 may in turn receive the packets on an upstream link at a rate that matches the upstream data rate in the corresponding table, and forward a copy of the packets on each downstream link at the corresponding downstream data rate in the table. The internal nodes 732 may reduce the upstream data rate to match the downstream data rates if necessary, e.g., by dropping some of the packets in a proper order. For example, the internal nodes 732 may discard every one out of $ru_{ij}/rd_{ij}$ messages and transmit the remaining messages. As such, each leaf node 720 may subsequently receive on its upstream link from a corresponding internal node 732 a copy of the packets at about the slave rate of the corresponding leaf node 720.

For instance, the root node 710 may transmit the packets at the master rate $r_m$ to a first downstream internal node 732 (n1). The first downstream internal node 732 (n1) may receive the packets at a rate that matches its upstream data rate $ru_{11}$ in Table 793. The first downstream internal node 732 (n1) may then transmit the packets at an about equal first downstream data rate $rd_{11}$ to a second downstream internal node 732 (n2) and at a reduced second downstream data rate $rd_{12}$ to a third downstream internal node 732 (n3), as indicated in Table 793. The second downstream internal node 732 (n2) may receive the packets at a rate that matches its upstream data rate $ru_{21}$ in Table 791. The second downstream internal node 732 (n2) may then transmit the packets at an about equal first downstream data rate $rd_{21}$ to a first leaf node 720, at a reduced second downstream data rate $rd_{22}$ to a second leaf node 720, and at a further reduced third downstream data rate $rd_{23}$ to a third leaf node 720, as indicated in Table 791. The downstream data rates $rd_{21}$, $rd_{22}$, and $rd_{23}$ may match the slave rates $r_{s1}$, $r_{s2}$, and $r_{s3}$ of the first, second, and third leaf nodes 720, respectively. Similarly, the third downstream internal node 732 (n3) may receive the packets at a rate that matches its upstream data rate $ru_{31}$ in Table 792, and transmit the packets at a reduce first downstream data rate $rd_{31}$ to a fourth leaf node 720 and at a less reduced second downstream data rate $rd_{32}$ to a fifth leaf node 720, as indicated in Table 792. The downstream data rates $rd_{31}$ and $rd_{32}$ may match the slave rates $r_{s4}$ and $r_{s5}$ of the fourth and fifth leaf nodes 720, respectively.

The rate-varying multicast clock distribution scheme 700 and the rate-varying multicast scheme 600 may provide packets or synchronization information to the leaf nodes 720 and 620 at their corresponding slave rates while efficiently using the network bandwidth and preventing timing loops. The corresponding networks, e.g., the packet based networks 730 and 630, may substantially contribute in determining, processing, and filtering the incoming (upstream) and outgoing (downstream) rates of the network nodes, e.g., the internal nodes 732 and 632. Although the internal nodes 732 and 632 in the schemes above are each coupled to one upstream node via a single upstream link, in other embodiments one or more internal nodes in the network may be coupled to a plurality of upstream nodes via a plurality of corresponding upstream links. For instance, the internal nodes may be part of a plurality of trees and may receive packets from a plurality of root or master nodes associated with the different trees. Further, the tables associated with the internal nodes may be continuously updated, e.g., in a dynamic manner, as the leaf or slave nodes update or request higher or lower rates, are disconnected from the tree or network, and/or join the tree or network.

Figure 8:
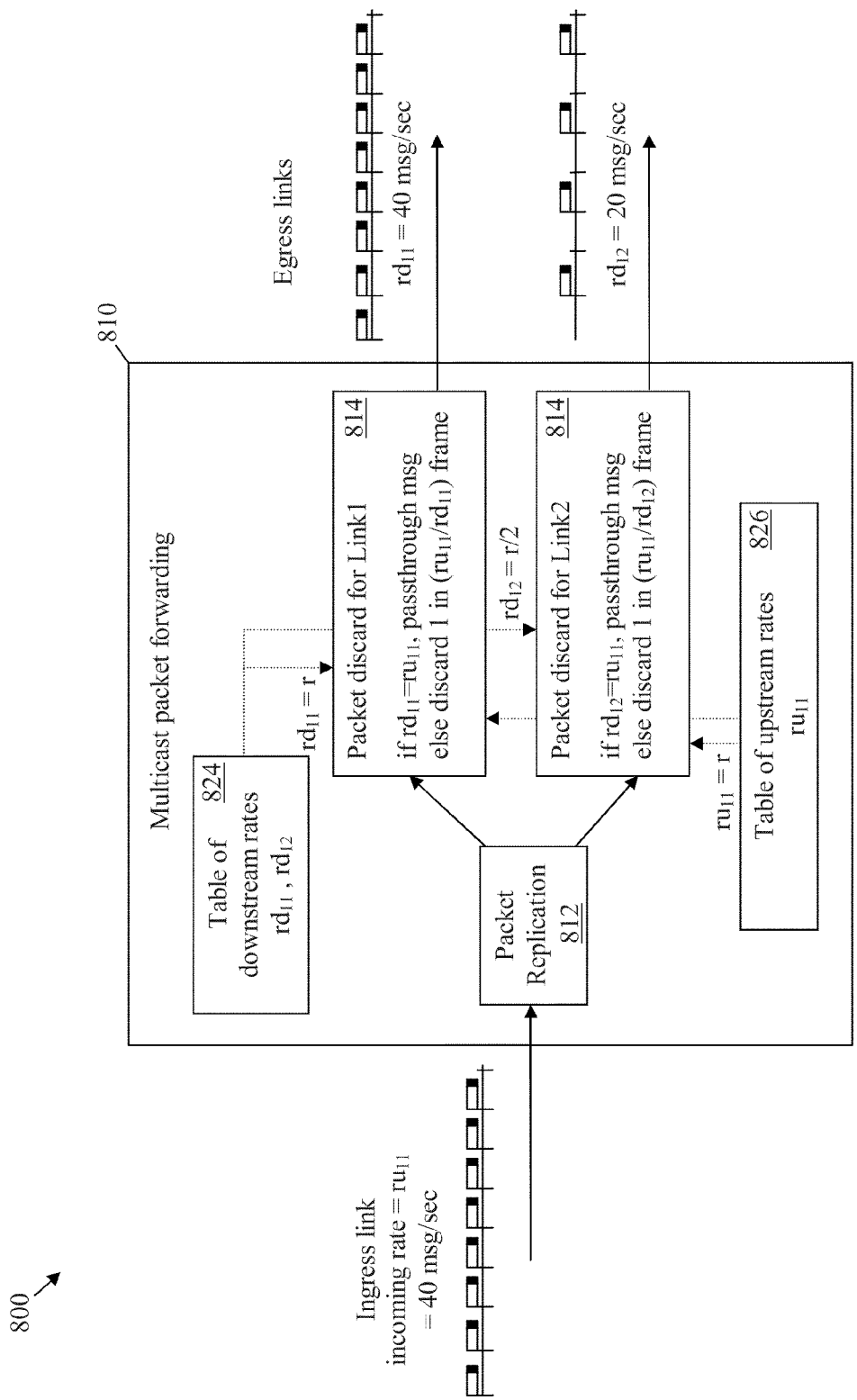
FIG. 8 is a schematic diagram of an embodiment of a multicast forwarding and discarding scheme.

FIG. 8 illustrates an embodiment of a multicast forwarding and discarding scheme 800 that may be implemented by an internal node in the rate-varying multicast clock distribution scheme 700 or the rate-varying multicast scheme 600, e.g., to adjust the data rate of downstream packets. The multicast forwarding and discarding scheme 800 may be implemented by an internal node 810 in a packet based network positioned between a root node and plurality of leaf nodes to transmit the packets on each associated downstream link at the data rate advertized by a corresponding downstream node. For instance, the internal node 810 may correspond to an internal node 632 in the packet based network 630 or an internal node 732 in the packet based network 730.

The internal node 810 may comprise a packet replication function (block 812) for each upstream or ingress link and one or more packet discard functions (block 814) for each downstream or egress link. The packet replication function (block 812) may receive a plurality of packets over the associated upstream or ingress link at an incoming upstream data rate, e.g., $ru_{11}$. For example, $ru_{11}$ may be equal to about 40 messages per second. At each packet discard function or block 814, the packets' upstream data rate may be compared to a corresponding downstream data rate. The downstream data rate may be obtained from a table of downstream data rates 824 that associates each egress link with a downstream data rate. Similarly, the packets' upstream data rate may be obtained from a table of upstream data rates 826 that associates each ingress link with an upstream data rate. The table of downstream data rates 824 and the table of upstream data rates 826 may be stored at the internal node 810 or the packet based network.

If the downstream data rate matches the upstream data rate, then the packets may be passed through without change. For example, if $rd_{11}=ru_{11}$ for a first egress link (Link 1) or $rd_{12}=ru_{11}$ for a second egress link (Link 2), then the packets may be sent on the corresponding egress link at about the same received rate, e.g., at about 40 messages per second. Alternatively, if the downstream data rate is less than the upstream data rate, then some of the packets may be discarded to reduce the packets' data rate appropriately. For example, if $rd_{11}<ru_{11}$ or $rd_{12}<ru_{11}$, then every one out of $ru_{11}/rd_{11}$ messages or one out of $ru_{11}/rd_{12}$ messages may be transmitted and the remainder discarded, respectively. The remaining non-discarded messages may be sent on the corresponding egress link. For example, only about 20 messages per second may be sent on the second egress link if the corresponding downstream data rate is equal to about half the upstream data rate.

Figure 9:
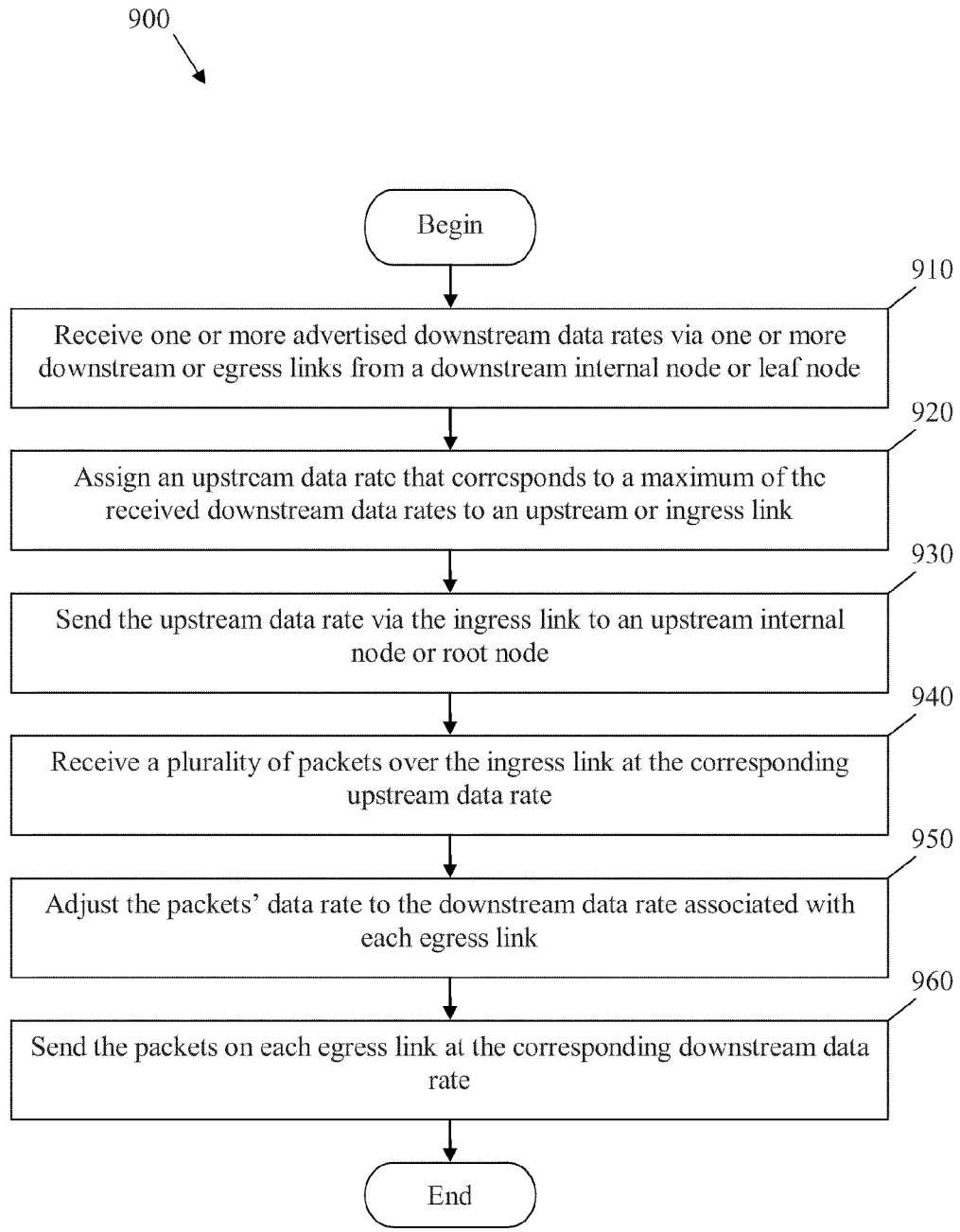
FIG. 9 is a flowchart of an embodiment of a rate-varying multicast method.

FIG. 9 illustrates an embodiment of a rate-varying multicast method 900 that may be implemented in the rate-varying multicast scheme 600 or the rate-varying multicast clock distribution scheme 700. Specifically, the rate-varying multicast method 900 may be implemented by an internal node 632 in the packet based network 630 or an internal node 732 in the packet based network 730. The method may begin at block 910, where one or more advertized downstream data rates may be received via one or more downstream or egress links from a downstream internal node or a leaf node. The downstream data rates may be maintained in a table at the internal node or the packet based network of the internal node. At block 920, an upstream data rate may that corresponds to a maximum of the received downstream data rates may be assigned to an upstream or ingress link. The upstream data rate may also be maintained in the table. At block 930, the upstream data rate may be sent via the ingress link to an upstream internal node or a root node. The blocks 910, 920, and 930 may correspond to the data rates advertisement scheme described in the rate-varying multicast clock distribution scheme 700.

At block 940, a plurality of packets may be received over the ingress link at the corresponding upstream data rate. At block 950, the packets' data rate may be adjusted to the downstream data rate associated with each egress link. For instance, the packets may be maintained without change if the upstream data rate and the downstream data rate are about equal or some of the packets may be discarded, e.g., using the multicast forwarding and discarding scheme 800, if the downstream data rate is less than the upstream data rate. At block 960, the packets may be sent on each egress link at the corresponding downstream data rate. The blocks 940, 950 and 960 may correspond to the downstream multicast scheme of the rate-varying multicast clock distribution scheme 700. The method 900 may then end.

Figure 10:
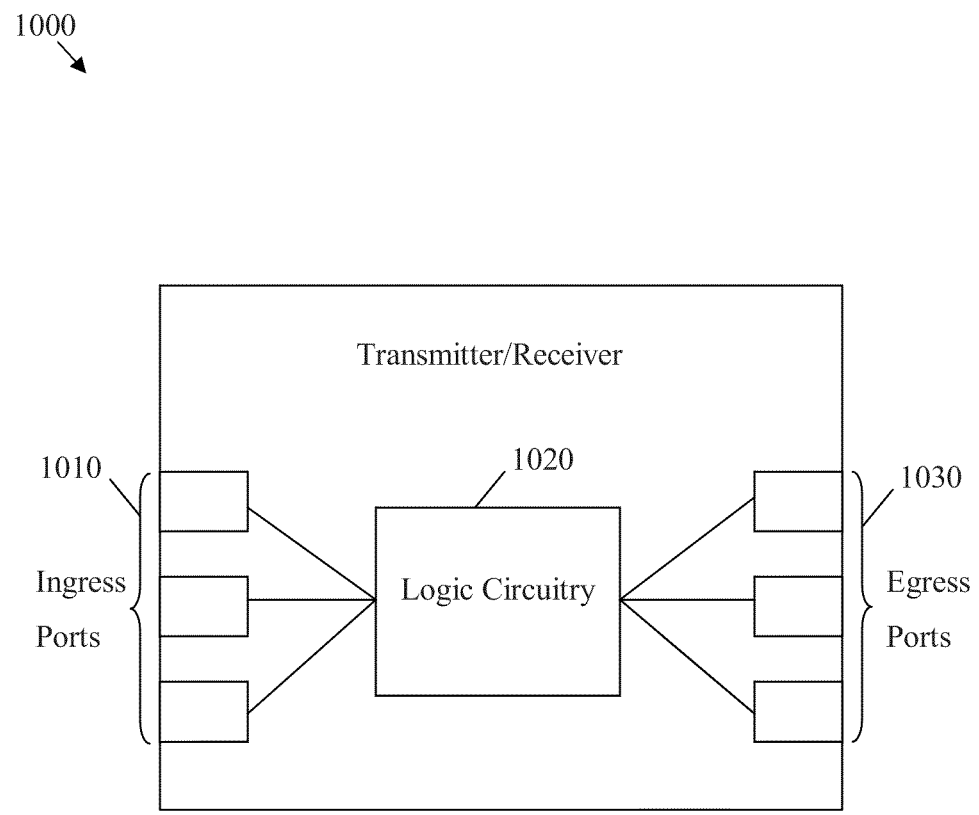
FIG. 10 is a schematic diagram of an embodiment of a transmitter/receiver unit.

FIG. 10 illustrates an embodiment of a transmitter/receiver unit 1000, which may be any device that transports packets through a network. For instance, the transmitter/receiver unit 1000 may be located in the root node, internal node, or leaf node in the schemes described above. The transmitted/receiver unit 1000 may comprise one or more ingress ports or units 1010 for receiving packets, objects, or type-length-values (TLVs) from other network components, logic circuitry 1020 to determine which network components to send the packets to, and one or more egress ports or units 1030 for transmitting frames to the other network components. The logic circuitry 1020 may also determine the proper data rates to transmit the packets via the downstream or egress links.

Figure 11:
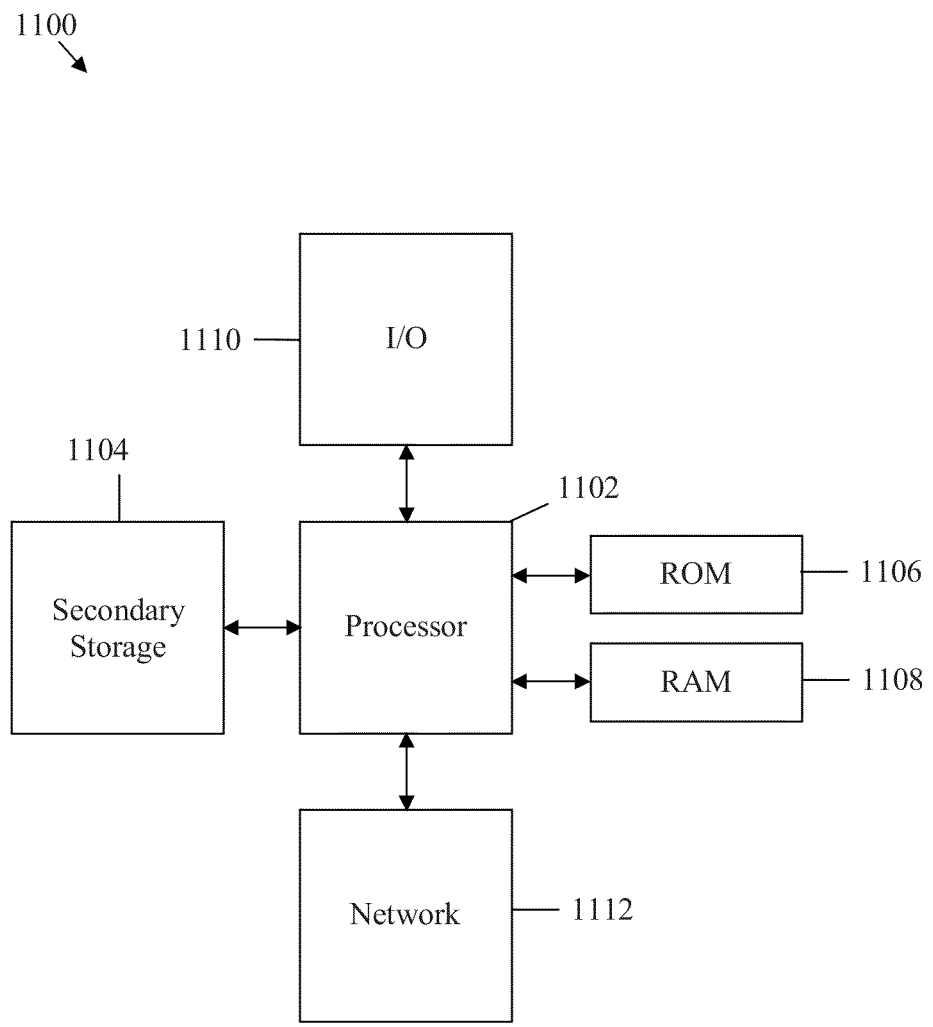
FIG. 11 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 11 illustrates a typical, general-purpose network component 1100 suitable for implementing one or more embodiments of the components disclosed herein. The network component 1100 includes a processor 1102 (which may be referred to as a central processor unit or CPU) that is in communication with memory devices including second storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The second storage 1104 is typically comprised of one or more disk drives or tape drives and is used for non-volatile storage of data and as an over-flow data storage device if RAM 1108 is not large enough to hold all working data. Second storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of second storage 1104. The RAM 1108 is used to store volatile data and perhaps to store instructions. Access to both ROM 1106 and RAM 1108 is typically faster than to second storage 1104.

At least one embodiment is disclosed and variations, combinations, and/or modifications of the embodiment(s) and/or features of the embodiment(s) made by a person having ordinary skill in the art are within the scope of the disclosure.

Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
an upstream node in a packet based network that multicasts a plurality of packets;
an intermediary node coupled to the upstream node; and
a plurality of downstream nodes coupled to the intermediary node,
wherein the upstream node, the intermediary node, and the downstream nodes are arranged in a tree topology, and
wherein the intermediary node is configured to:
receive a plurality of downstream data rates advertised by the downstream nodes;
receive the packets from the upstream node at an upstream data rate equal to a maximum data rate of the downstream data rates; and
multicast the packets from the intermediary node to the downstream nodes at the downstream data rates, and wherein the upstream node is coupled to a master clock associated with the maximum data rate and the downstream nodes are coupled to a plurality of corresponding slave clocks associated with the downstream data rates of the leaf nodes,
wherein the packets comprise timestamps or frequency and time synchronization information for the master clock and the slave clocks, and
wherein some of the packets are dropped when at least one of the downstream data rates is less than the upstream data rate.

2. The apparatus of claim 1, wherein the master clock and the slave clocks are synchronized in a unidirectional or a bidirectional manner.

3. The apparatus of claim 1, wherein the intermediary node comprises a first table that comprises the downstream data rates associated with a plurality of egress links and a second table that comprises the upstream data rate associated with an ingress link.

4. The apparatus of claim 3, wherein the intermediary node is part of a tree topology that couples the upstream node to the downstream nodes, and wherein the intermediary node is coupled to the upstream node via the ingress link, and wherein the intermediary node is coupled to the downstream nodes via the egress links.

5. The apparatus of claim 1, wherein the different rates of the downstream nodes depend on at least one of the following performance metrics of the downstream nodes: characteristics of corresponding slave clock designs, various packet network impairments, packet selection and filtering algorithms, oscillators used in the downstream nodes, and operational states of the downstream nodes.

6. The apparatus of claim 1, wherein the upstream node is a video content transmitter and the downstream nodes are video content receivers, and wherein a first set of the downstream nodes comprises high capacity receivers and a second set of the downstream nodes comprises lower capacity receivers.

7. The apparatus of claim 1, wherein the dropped packets are packets destined for only downstream nodes that advertise downstream data rates that are less than the upstream data rate.

8. The apparatus of claim 7, wherein the packets are forwarded, without dropping any of the packets, to the downstream nodes that advertise downstream data rates that are the same as the upstream data rate.

9. The apparatus of claim 7, wherein the number of dropped packets for one of the downstream nodes is determined by the upstream data rate divided by the downstream data rate for the one of the downstream nodes.

10. A network component comprising:
a packet replication block coupled to an ingress link and configured to replicate a plurality of packets received on the ingress link at an upstream data rate;

a packet discard block coupled to the packet replication block and to an egress link; and
a second packet discard block coupled to the packet replication block and to a second egress link,
wherein the packet discard block is configured to:
pass through the received packets without dropping the received packets when a downstream data rate that corresponds to the egress link matches the upstream data rate that corresponds to the upstream link; and
reduce some of the received packets to match the downstream data rate when the downstream data rate that corresponds to the egress link is less than the upstream data rate that corresponds to the upstream link,
wherein the second packet discard block is configured to reduce some of the received packets to match a second downstream data rate when the second downstream rate is less than the upstream data rate,
wherein the second downstream data rate corresponds to a data rate for the second egress link, and
wherein the packet replication block forwards the same quantity of packets to the packet discard block and the second packet discard block.

11. The network component of claim 10, wherein the packet discard block is further configured to obtain the upstream data rate associated with the ingress link from a table of upstream data rates and obtain the downstream data rate associated with the egress link in a second table of downstream data rates.

12. The network component of claim 11, wherein the packet discard block is configured to discard a number of the received packets in a quantity of packets and transmit a remaining number of the received packets such that the ratio of the transmitted packets to discarded packets is about equal to the ratio of the upstream data rate to the downstream data rate when the downstream data rate is less than the upstream data rate.

13. The network component of claim 11, wherein the packet discard block is further configured to compare the upstream data rate obtained from the upstream table and the downstream data rate obtained from the downstream table.

14. A method comprising:
receiving a plurality of advertised downstream data rates via a plurality of egress links from a plurality of downstream nodes;
assigning an upstream data rate that corresponds to a maximum of the received downstream data rates to an ingress link;
advertising the upstream data rate via the ingress link to an upstream node;
receiving a plurality of packets via the ingress link at the upstream data rate; and
forwarding the packets to the downstream nodes at rates that match the advertised downstream data rates from the downstream nodes,
wherein the packets are dropped when the advertised downstream data rates are less than the upstream data rate,
wherein the downstream nodes comprise a plurality of leaf nodes within a multicast tree distribution tree topology that are coupled to a packet based network,
wherein the upstream node comprises a root node within the multicast tree distribution tree topology that is coupled to the packet based network, and
wherein the downstream data rates and the upstream data rate are advertised and updated continuously in a dynamic manner when the downstream nodes request higher or lower data rates, one or more of the downstream nodes are disconnected from the packet based network, and one or more of the downstream nodes join the packet based network.

15. The method of claim 14, wherein the downstream data rates and the upstream data rate determine quantities of transmitted messages per second and are maintained by the packet based network.

16. The method of claim 14, wherein the downstream data rates and the upstream data rate are advertised and expressed in powers of two, and wherein a number of packets dropped when forwarding the packets to one of the downstream nodes is determined by the upstream data rate divided by the advertised downstream data rate received from the one of the downstream nodes.

* * * * *

UNITED STATES PATENT AND TRADEMARK OFFICE
CERTIFICATE OF CORRECTION

| | | |
|---|---|---|
| PATENT NO. | : 8,625,467 B2 | Page 1 of 1 |
| APPLICATION NO. | : 13/028656 | |
| DATED | : January 7, 2014 | |
| INVENTOR(S) | : Michel Ouellette et al. | |

It is certified that error appears in the above-identified patent and that said Letters Patent is hereby corrected as shown below:

On the title page item 56 should read:

Foreign Communication From a Related Counterpart Application, European Application 11710916.5, European Office Action dated Jan. 10, 2013, 7 pages.

Page 1, References Cited, item 56, under Other Publications, the following cited art should have its own line and not be combined with the cited art listed before it:

Foreign Communication From a Related Counterpart Application, PCT Application, PCT/US2011/025037, International Search Report, Jul. 6, 2011, 6 pages.

In the Claims

Column 14, Line 12 should read: "downstream nodes at the downstream data rates,"

Column 14, Line 35 should read: "downstream nodes, wherein the intermediary node is"

Signed and Sealed this
Fifteenth Day of July, 2014

Michelle K. Lee
*Deputy Director of the United States Patent and Trademark Office*